(12) United States Patent
Mesiti

(10) Patent No.: US 11,785,918 B2
(45) Date of Patent: Oct. 17, 2023

(54) SYSTEMS AND METHODS FOR CLEANSING LARGE ANIMALS USING SCRUB GLOVES

(71) Applicant: Nathan Mesiti, Belleville, IL (US)

(72) Inventor: Nathan Mesiti, Belleville, IL (US)

(73) Assignee: Nathan Mesiti, Belleville, IL (US)

( * ) Notice: Subject to any disclaimer, the term of this patent is extended or adjusted under 35 U.S.C. 154(b) by 620 days.

(21) Appl. No.: 17/070,839

(22) Filed: Oct. 14, 2020

(65) Prior Publication Data

US 2021/0100217 A1 Apr. 8, 2021

Related U.S. Application Data

(63) Continuation-in-part of application No. 16/143,604, filed on Sep. 27, 2018, now Pat. No. 11,129,513, which is a continuation-in-part of application No. 14/946,958, filed on Nov. 20, 2015, now abandoned.

(60) Provisional application No. 62/915,318, filed on Oct. 15, 2019.

(51) Int. Cl.
| | | |
|---|---|---|
| *A01K 13/00* | (2006.01) | |
| *A41D 19/00* | (2006.01) | |
| *B32B 5/02* | (2006.01) | |
| *B32B 5/26* | (2006.01) | |
| *B32B 25/04* | (2006.01) | |
| *B32B 25/10* | (2006.01) | |
| *A41D 31/10* | (2019.01) | |

(52) U.S. Cl.
CPC .......... *A01K 13/001* (2013.01); *A41D 19/001* (2013.01); *A41D 19/0044* (2013.01); *A41D 31/10* (2019.02); *B32B 5/024* (2013.01); *B32B 5/26* (2013.01); *B32B 25/04* (2013.01); *B32B 25/10* (2013.01); *A41D 2500/20* (2013.01); *A41D 2500/50* (2013.01); *B32B 2262/0276* (2013.01); *B32B 2307/7265* (2013.01); *B32B 2437/02* (2013.01)

(58) Field of Classification Search
CPC ..... A47L 13/18; A01K 13/001; A41D 19/001; A41D 31/10; B32B 5/024; B32B 5/26; B32B 25/04; B32B 25/10; B32B 2262/0276; B32B 2307/7265
See application file for complete search history.

(56) References Cited

U.S. PATENT DOCUMENTS

| | | | | |
|---|---|---|---|---|
| 5,676,092 A | * | 10/1997 | Ortolivo | A47L 13/18 119/650 |
| 6,000,060 A | * | 12/1999 | Borucki-Mastej | A47L 13/18 2/167 |
| 6,016,571 A | * | 1/2000 | Guzman | A41D 19/0055 2/163 |

(Continued)

FOREIGN PATENT DOCUMENTS

| | | | | | |
|---|---|---|---|---|---|
| CN | 101933788 A | * | 1/2011 | ............ | A47L 13/16 |
| KR | 100981761 B1 | | 9/2010 | | |

(Continued)

*Primary Examiner* — Marc Carlson
(74) *Attorney, Agent, or Firm* — Lewis Rice LLC

(57) ABSTRACT

Cleansing devices in the form of ergonomic scrub gloves for cleansing various surfaces including large animals and associated animal contact surfaces. The gloves include an inner layer, which is generally waterproof, with an outer layer comprising an abrasive weave.

19 Claims, 11 Drawing Sheets

(56) References Cited

U.S. PATENT DOCUMENTS

| | | | |
|---|---|---|---|
| 6,192,543 B1* | 2/2001 | Lee | A47L 13/18 451/523 |
| 6,292,948 B1* | 9/2001 | Chen | A47K 7/02 2/158 |
| 6,513,998 B1* | 2/2003 | Barry | A41D 19/0079 401/196 |
| 7,730,574 B1* | 6/2010 | Cox, Sr. | A47L 13/18 15/227 |
| 11,129,513 B2* | 9/2021 | Mesiti | B32B 7/12 |
| D951,547 S* | 5/2022 | Huang | D28/63 |
| 2005/0177965 A1* | 8/2005 | Edoh | A47L 13/18 15/160 |
| 2005/0193515 A1* | 9/2005 | Chang | A47K 7/02 2/167 |
| 2008/0178366 A1* | 7/2008 | Daher | A47L 13/18 2/163 |
| 2008/0244848 A1* | 10/2008 | Firouzman | A47L 13/12 15/118 |
| 2009/0126137 A1* | 5/2009 | Lyons | B32B 5/06 15/210.1 |
| 2009/0249573 A1* | 10/2009 | Ruiz | A47L 13/18 15/227 |
| 2010/0218326 A1* | 9/2010 | Yamaguchi | A47L 13/18 2/167 |
| 2011/0004974 A1* | 1/2011 | Firouzman | A47L 13/12 2/161.8 |
| 2011/0167581 A1* | 7/2011 | Arzarzar | B32B 1/00 15/227 |
| 2011/0252586 A1* | 10/2011 | Schouten | B60S 3/045 15/229.11 |
| 2011/0258755 A1* | 10/2011 | Arfi | A47L 17/04 2/167 |
| 2012/0210532 A1* | 8/2012 | Slade, Jr. | A47L 13/18 15/227 |
| 2014/0157539 A1* | 6/2014 | Megerdichian | A47L 13/18 15/227 |
| 2015/0289728 A1* | 10/2015 | Penaz | A47K 7/03 15/104.93 |
| 2015/0335222 A1* | 11/2015 | Jones | B32B 5/26 15/209.1 |
| 2016/0316986 A1* | 11/2016 | Oster | A47L 13/19 |
| 2017/0143178 A1* | 5/2017 | Mesiti | A46B 5/04 |
| 2019/0021571 A1* | 1/2019 | Mesiti | B32B 3/14 |
| 2021/0112894 A1* | 4/2021 | Griffiths | A41D 19/0013 |

FOREIGN PATENT DOCUMENTS

| | | | | |
|---|---|---|---|---|
| KR | 20110000556 U | * | 1/2011 | |
| WO | WO-9747212 A1 | * | 12/1997 | A41D 19/0006 |
| WO | 2010/107297 A2 | | 9/2010 | |
| WO | WO-2016190926 A1 | * | 12/2016 | A01K 13/001 |

* cited by examiner

SYSTEMS AND METHODS FOR CLEANSING LARGE ANIMALS USING SCRUB GLOVES

CROSS REFERENCE TO RELATED APPLICATIONS

This application claims benefit of U.S. Provisional Patent Application No. 62/915,318, filed Oct. 15, 2019. This application is also a Continuation-In-Part (CIP) of United States Utility Patent Application No. 16/143,604, filed Sep. 27, 2018, which is in turn a Continuation-In-Part (CIP) of U.S. Utility patent application Ser. No. 14/946,958, filed Nov. 20, 2015. The entire disclosure of all the above documents is herein incorporated by reference.

BACKGROUND OF THE INVENTION

1. Field of the Invention

This disclosure is related to the field of cleansing large animals. More particularly, this disclosure is related to systems and methods for cleansing large animals using an ergonomic scrubbing glove worn by a wearer who may be cleansing the large animals that may be safer for the animal and more efficient and effective in cleansing.

2. Description of the Related Art

Cleansing large animals is a time-consuming task at best. Traditionally, the variety of different cleansing solutions and products necessary to cleanse the whole animal effectively could be very expensive, harmful to a person's skin, and harmful to the animal if used inappropriately. All too frequently, cleansing large animals not only takes longer than one would like, but the results when cleansing with traditional methods are typically an imperfect cleansing of the animal. Further, people with arthritis or other debilitating conditions often encounter significant difficulty in the processes of cleansing large animals when using prior or conventional cleansing equipment and techniques.

Cleansing large animals also presents risks to both the individual performing the cleansing (the "cleanser") and to the animal being cleansed. First, conventional large animal cleansing methods typically require the cleanser to stand close to, and sometimes in possibly dangerous positions, the large animal to be cleansed. This alone may pose an acceptable risk; however, this risk may become unacceptable when the methods of cleansing upset the large animal being cleansed. Unfortunately, many prior methods for cleansing large animals are upsetting to large animals. Second, many prior methods for large animal cleansing may injure the large animals. Some prior cleansing methods even require the use of gloves or brushes that may not be used on certain parts of large animals, such as the portions of the large animals below their knees or above their shoulders.

For example, some conventional cleansing methods call for the use of a curry brush or a rake-style curry glove (collectively referred to herein, along with similar devices, as a "curry brush"). Such curry brushes and gloves are typically made from rubber or another resilient but semi-flexible material, and they are typically covered with rows and rows of small, rounded spikes. These small spikes may be used to comb and massage the hair on an animal because the small spikes penetrate between some portions of the coat. However, this process often fails to contact many strands of hair, leaving hair follicles and the epidermal layer relatively uncleansed, due in part to the spacing of the spikes being much greater in extent than the spacing of the animal's hairs. Further, a practical result of using a curry brush is that often the curry brush will remove loose hair in the animal's coat. In some circumstances, these small spikes may even damage a large animal's coat and/or scour the skin. Further, curry brushes and gloves are not to be used on the lower leg and heads of most large animals at least because the large animals' legs, and heads are relatively sensitive, bony, full with veins, and/or otherwise incompatible with curry spikes or rake style gloves.

Other problems exist in conventional cleansing methods. For example, some prior cleansing methods require many laborious steps and many tools to accomplish the desired cleansing. One such step required by many cleansing methods is detailed grooming prior to cleansing. The grooming process may be helpful for removing larger debris from the large animal. However, such additional steps may be difficult, time consuming, and costly. Further, many cleansing processes require the use of sweat scrapers, many sponges, curry brushes, and many towels. These various pieces of equipment are often used in succession, requiring many different process steps to arrive at the end result of a cleansed large animal. Further, there may be additional costs and time associated with purchasing and maintaining all of these pieces of equipment. Moreover, some of the products used may open scabs and fresh wounds on the animal, potentially allowing for contamination from flies, bacteria, and/or pathogens.

Prior cleansing methods for large animals are typically inefficient. Such processes often require a significant outlay of cleansing devices (as discussed above) and cleansing solutions or products (collectively referred to herein as "cleansing solutions"). For example, most of the above tools are inefficient at holding cleansing solutions or other cleansing materials for distribution and delivering those solutions across a large animal's body and into the large animal's coat and skin. Moreover, prior scrubbing and scouring devices often require a cleanser to grasp the device while cleansing, thereby restricting the cleanser's dexterity and full functionality of their hand. This ergonomics problem may limit the ability to distribute cleansing solutions effectively across the animal's body, as well as increase the amount of cleansing solution used, increasing the costs associated with cleansing solutions, Additionally, ergonomics problems will typically increase the time required to perform a large animal cleansing and also increase the risk of work-related injuries while the cleanser is performing the large animal cleansing. Further, using non-ergonomic devices may simply be uncomfortable to the cleanser.

Similarly, prior cleansing devices that are formed as gloves may have additional issues. For example, such prior cleansing devices typically fail to cover the whole of the hand with useful cleansing surfaces. In most cases, only the fronts of the fingers and the palms of the cleanser are covered with useful cleansing surfaces. Further, these supposedly useful cleansing surfaces are often not actually useful. For example, the cleansing surfaces may be unnecessarily sharp or rigid, which may damage the relevant large animal's coat and/or skin. These supposedly useful surfaces may also poorly carry water and/or cleansing solutions to the coat of the large animal. Further, relatively smooth materials such as sheets of plastic or rubber may be used to form the cleansing surfaces of conventional cleansing devices. Such smooth cleansing surfaces again may not hold water and/or cleansing solutions effectively, generally resulting in an inefficient cleansing process.

Additional time spent cleansing may also be detrimental. Many large animals have coats or skin that may become damaged if cleansing solutions, liniment, or bug spray remain on the coat or skin for too long of a period of time. Extended cleansing times may result in damaged coats and/or irritated skin. Further, the process of removing the cleansing solutions on various portions of the large animal's body may become more difficult as time passes. Similarly, where the cleanser does not wear gloves or other protection for the cleanser's hands, the water and/or cleansing solutions may damage the cleanser's hands and/or skin.

The above problems are exacerbated in the case of cleansing a show animal at least because show animals typically must be frequently cleansed. Further, the coats and skin of show animals typically must be kept in top condition, and accordingly, only the most gentle, efficient, and effective cleansing methods may be used. This is a further reason why curry brushes (and/or rake style or rubber nub style gloves) are less than ideal for cleansing large animals. Cleansing an animal using a curry brush (and/or rake style or rubber nub style gloves) typically result in the removal of hair from the animal, which may be acceptable is some cases. However, show animals are typically cleansed frequently, possibly once or twice per week. In such a case, constant removal of hair via a curry brush (and/or rake style or rubber nub style gloves) is both unnecessary and potentially detrimental. The general purpose of cleansing a show animal is to provide a presentable and often shiny coat for the animals. The constant removal of hair from the animal may work against these purposes. Further, because curry brushes (and/or rake style or rubber nub style gloves) typically do not interact with many of the hairs on an animal's coat, as discussed above, curry brushes inefficiently remove the oils, salt, and grime built, up on an animal's hairs and epidermal layer.

SUMMARY OF THE INVENTION

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

Described herein, among other things, is a method of cleansing a non-human animal, the method comprising: wetting a non-human animal; providing a cleansing glove, said cleansing glove comprising: an inner waterproof layer forming a palm portion, a backhand portion, a cuff portion, a thumb portion and at least one finger portion; and an outer woven mesh layer overlying said palm portion, said backhand portion, said thumb portion and said at least one finger portion; placing said cleansing glove on a hand of a human user; immersing said cleansing glove in a liquid cleansing material; moving said cleansing glove within said liquid cleaning material to capture some of said liquid cleansing material in said outer woven mesh layer and at least some of said liquid cleansing material between said outer woven mesh later and said inner waterproof layer; transferring said cleansing solution captured by said cleansing glove to said non-human animal; and rinsing said cleansing solution from said, non-human animal.

In an embodiment of the method, the outer woven mesh layer is attached to said inner waterproof layer only at a band located at said cuff.

In an embodiment of the method, the outer woven mesh layer is a multi-layer structure.

In an embodiment of the method, the multi-layer structure comprises 4 layers.

In an embodiment of the method, at least one layer in said multi-layer structure is formed of woven non-porous polyester fiber.

In an embodiment of the method, the non-porous polyester fiber is between 100-1200 denier, between 100-900 denier, between 400-600 denier, or between 800-1200 denier.

There is also described herein, in an embodiment, a scrub glove, the scrub glove comprising: an inner waterproof layer formed to fit over a wearer's thumb, fingers, palm, and back of their hand, said inner layer further including a cuff; an outer layer of an abrasive woven mesh material formed to fit over said inner layer; and a band fitting over and about an open end of said outer layer where said open end is positioned about said cuff of said inner layer, said band securing said open end and said cuff; wherein said inner and outer layers are only secured by said band so when said glove is used for cleaning, said outer layer of said glove moves separately from said inner layer; and wherein at least a portion of said inner layer is not within said outer layer. In an embodiment of the scrub glove, the band is secured in place by radio frequency (rF) heating.

In an embodiment of the scrub glove, the inner waterproof layer of said scrub glove is made of a rubber material.

In an embodiment of the scrub glove, the outer layer is a multi-layer structure.

In an embodiment of the scrub glove, the multi-layer structure comprises 4 layers.

In an embodiment of the scrub glove, at least one layer in said multi-layer structure is formed of woven non-porous polyester fiber.

In an embodiment of the scrub glove, the non-porous polyester fiber is between 100-1200 denier. There is also described herein, in an embodiment, a method of cleansing a non-human animal, the method comprising: wetting a non-human animal; providing a cleansing glove, said cleansing glove comprising: an inner waterproof layer formed to fit over a wearer's thumb, fingers, palm, and back of their hand, said inner layer further including a cuff: an outer layer of an abrasive woven mesh material formed to fit over said inner layer; and a band fitting over and about an open end of said outer layer where said open end is positioned about said cuff of said inner layer, said band securing said open end and said cuff; wherein said inner and outer layers are only secured by said band so when said glove is used for cleaning, said outer layer of said glove moves separately from said inner layer; and wherein at least a portion of said inner layer is not within said outer layer; placing said cleansing glove on a hand of a human user; capturing cleansing material in at least one of said outer woven mesh layer and between said outer woven mesh later and said inner waterproof layer; transferring said cleansing solution captured by said cleansing glove to said non-human animal; and rinsing said cleansing solution from said non-human animal.

In an embodiment of the method, the capturing comprises: immersing said cleansing glove in a liquid cleansing material; and moving said cleansing glove within said liquid cleaning material. In an embodiment of the method, the capturing comprises: placing a solid cleansing product between said inner waterproof layer and said outer layer.

BRIEF DESCRIPTION OF THE DRAWINGS

Corresponding reference characters indicate corresponding parts throughout the several views of the FIGS.

DETAILED DESCRIPTION OF THE PREFERRED EMBODIMENT(S)

Figure 1:
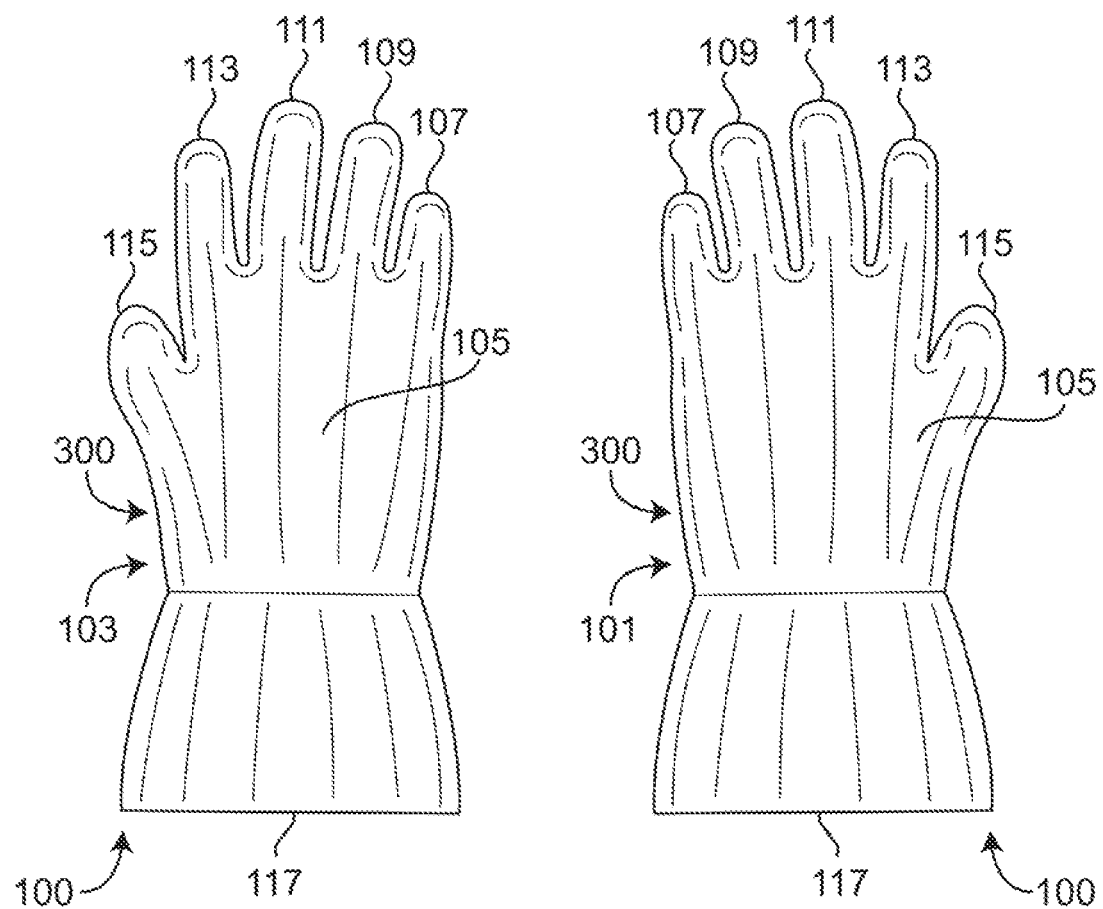
FIG. 1 is a plan view of right-hand and left-hand ergonomic scrub gloves of the present application from the palm side of the respective gloves.
Figure 2:
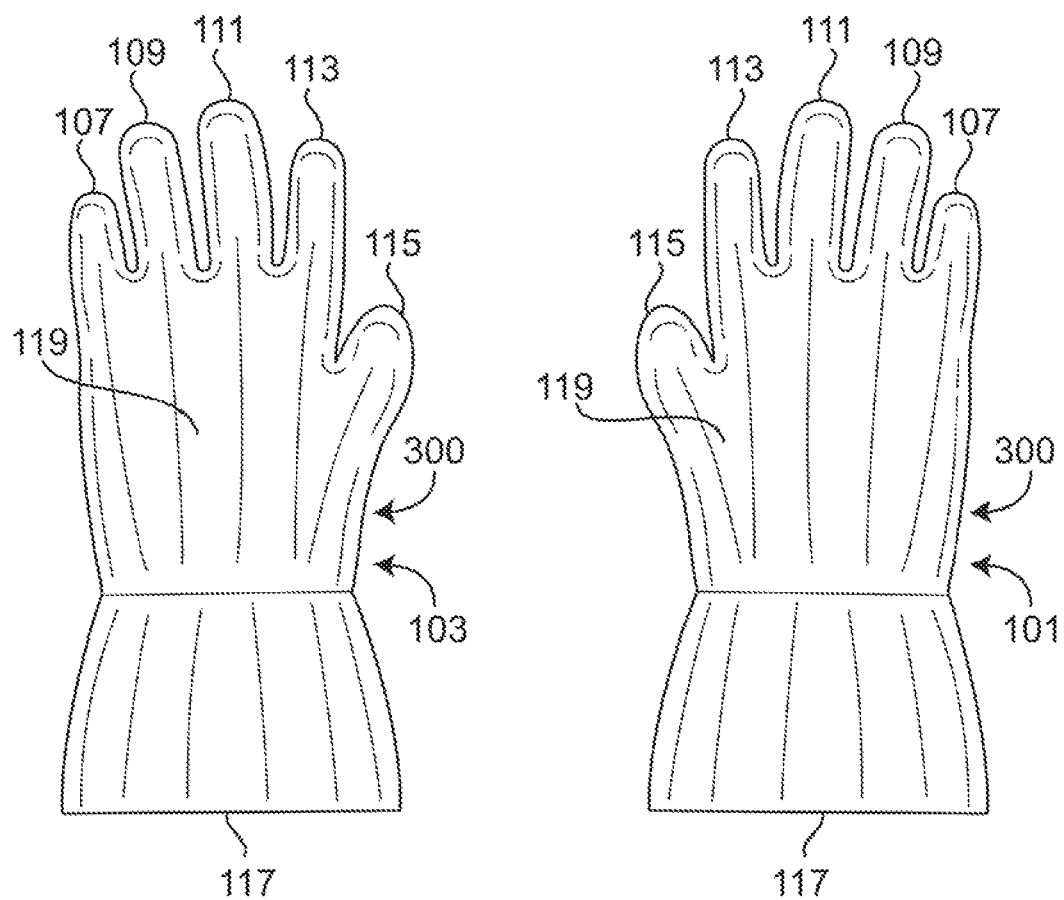
FIG. 2 is a plan view of the gloves depicted in FIG. 1 from the back hand side thereof.
Figure 3:
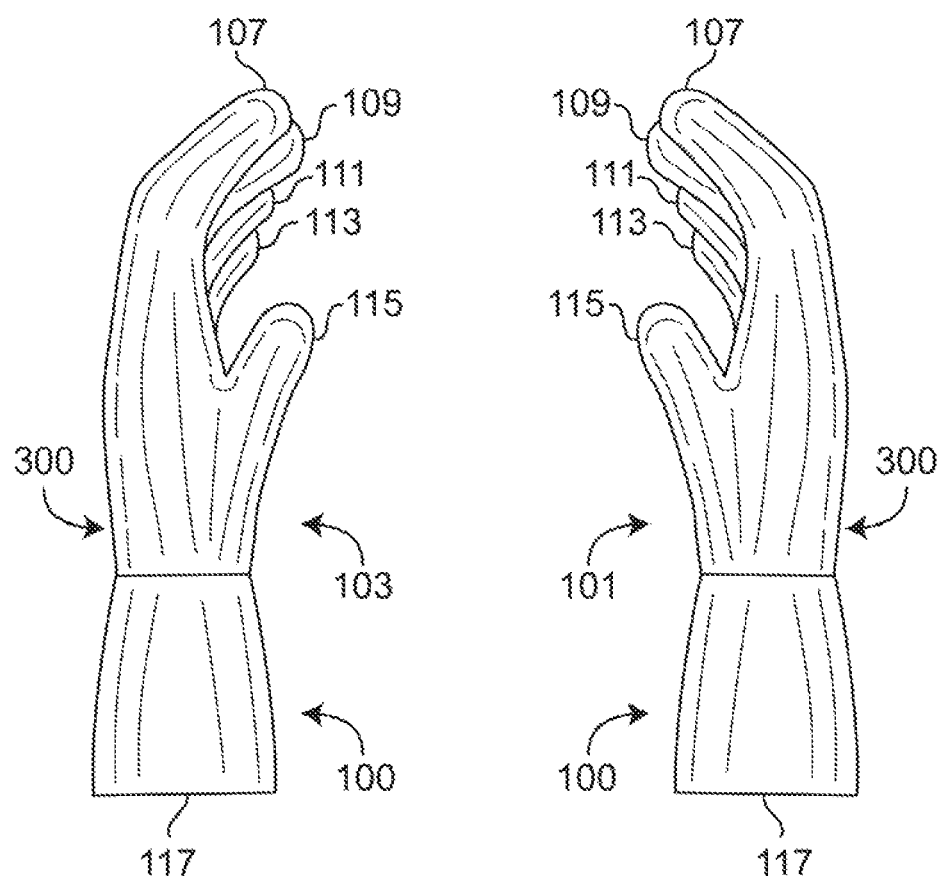
FIG. 3 is a side elevation view of the gloves depicted in FIG. 1 from their respective thumb sides.

The following detailed description and disclosure illustrates by way of example and not by way of limitation. This description will clearly enable one skilled in the art, to make and use the disclosed systems and methods, and describes several embodiments, adaptations, variations, alternatives and uses of the disclosed systems and methods. As various changes could be made in the above constructions without departing from the scope of the disclosures it is intended that all matter contained in the description or shown in the accompanying drawings shall be interpreted as illustrative and not in a limiting sense.

As stated above, this disclosure is related to the field of cleansing large animals. However, although the instant disclosure focuses on scrub gloves for use with large animals, this is not intended to be limiting for every embodiment, and the instant, disclosure may apply equally to cleansing other animals, such as massive animals and small animals. The term "large animal" used herein may be any non-human animal that may be treated by a large animal veterinarian, including without limitation horses, cattle, pigs, sheep, and other livestock. Further, the term "massive animal" used herein may be any non-human animal weighing over 70 pounds, including without limitation horses, cattle, pigs, sheep, deer, caribou, moose, elephants, rhinoceros, hippopotamus, apes, zoo and other non-human animals larger than a medium sized dog, and similar animals. Further, the term "small animal" used herein may be any non-human animal, especially mammals, that is smaller than a massive animal, including without limitation dogs, cats, and other animals.

Referring to the drawings, and particularly referring to FIGS. 1-4, a set of cleansing devices 100 comprises an ergonomic scrub glove 101 and/or 103 for scrubbing various surfaces, including without limitation large animals, to thoroughly cleanse them. In the depicted embodiment, gloves 101 and 103 may be made of at least a rubber or other material impervious to liquid. Generally, each glove 101 and 103 includes a thumb and fingers 107, 109, 111, 113, and 115. Each glove 101 and 103 typically also includes a palm portion 105 and a backhand 119. Gloves 101 and 103 may be put on by the wearer (also known as the cleanser) in a conventional manner and, when worn, typically an open, cuff end 117 of each glove 101 and 103 may extend up past the wearer's wrist, effectively covering the wearer's hands and a portion of their forearm. This coverage may protect these portions of a wearer's body from exposure to the cleansing solutions with which scrub gloves 101 and 103 are used.

As further shown by the embodiment depicted in FIGS. 1-4, the fingers 107, 109, 111, 113, and 115, palm 105, and/or backhand 119 of gloves 101 and 103 may be covered and encased with a layer 300, which layer 300 may be made from (at least, in part) an abrasive, woven mesh material. Layer 300 may extend over any amount of the fingers 107, 109, 111, 113, and 115, palm 105, and/or backhand 119 including from the tips of the fingers furthest from the cuff end 117 to the cuff end 117. The abrasive, woven mesh material-forming layer 300 may be, for example, a nylon material or any other material that may be woven into an abrasive textile. Further, layer 300 may be attached to fingers 107, 109, 111, 113, and 115, palm 105, and/or backhand 119 of gloves 101 and 103 via for example, a flexible adhesive rubber compound material or other material capable of binding the abrasive, woven mesh material. Alternatively, layer 300 may be held in place by friction or similar phenomena based on the relative sizes and shapes of layer 300 and gloves 101 and 103.

Figure 4:
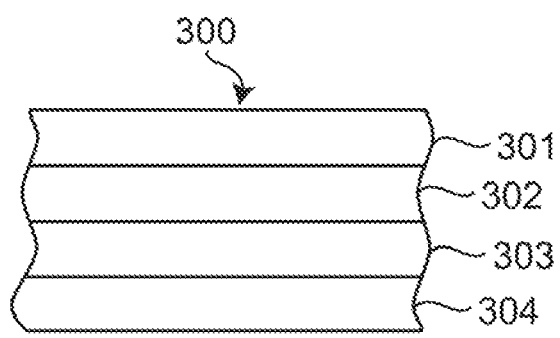
FIG. 4 is a partial sectional view of a multi-layer mesh material that may be used to cover the gloves depicted in FIG. 1.
Figure 5:
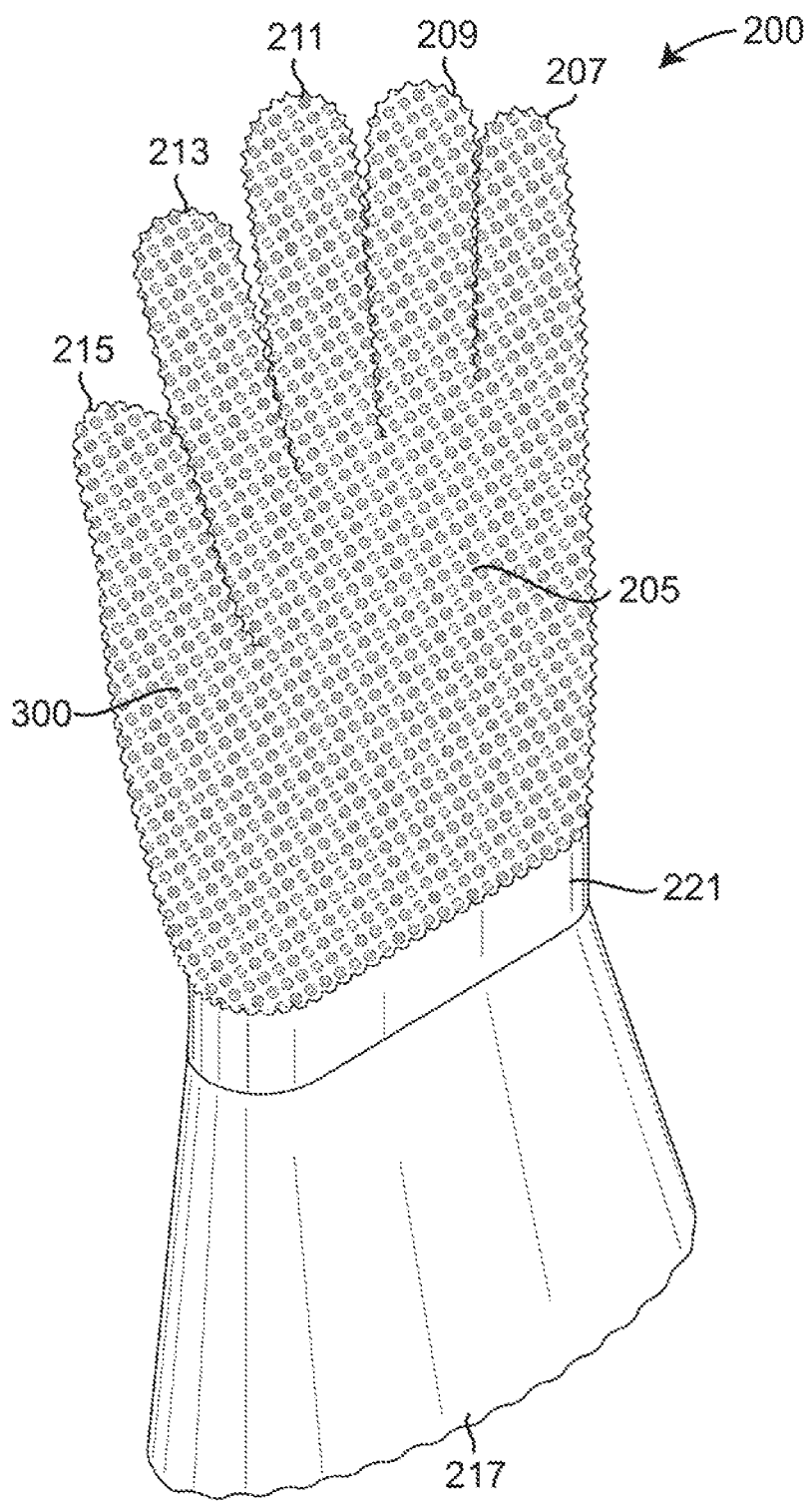
FIG. 5 is a perspective view of a second embodiment of an ergonomic scrub glove.
Figure 6:
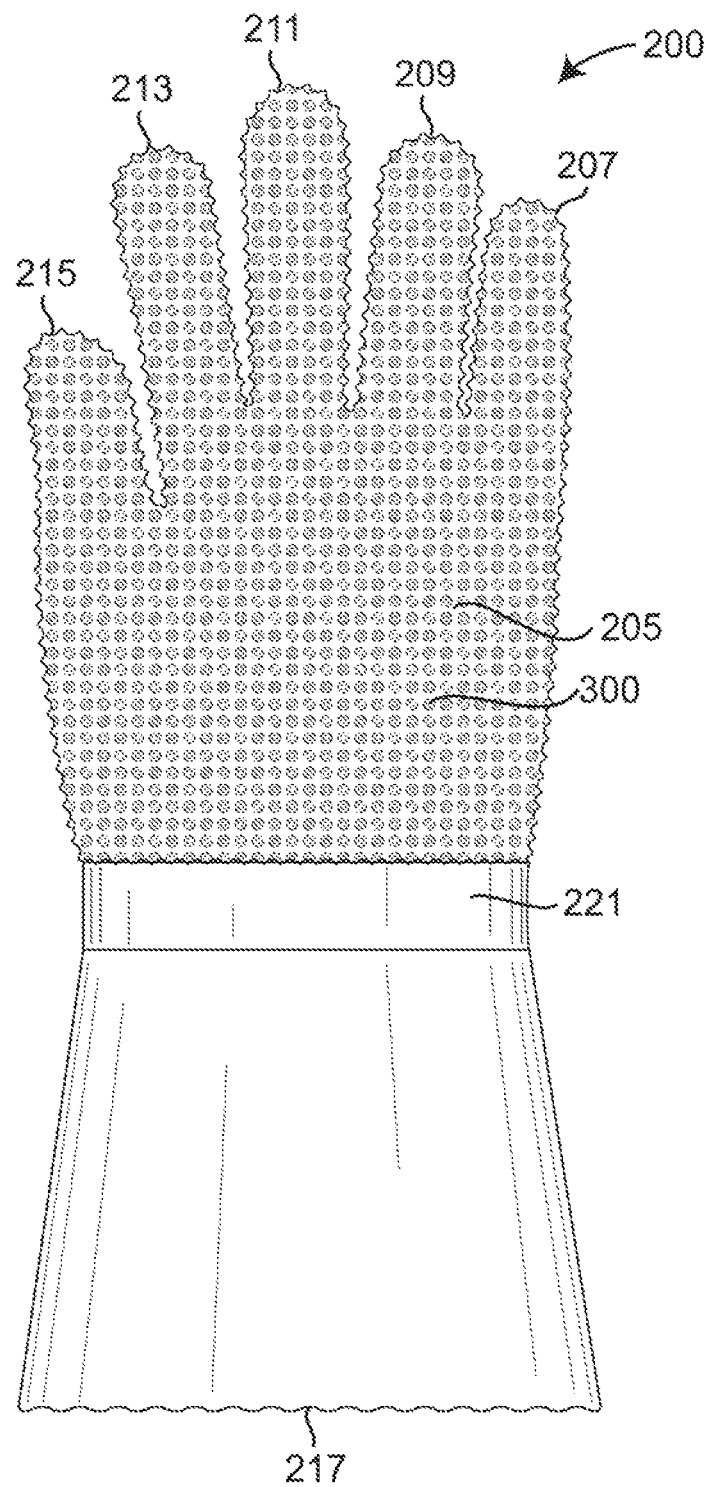
FIG. 6 is a plan view of the scrub glove depicted in FIG. 5 viewed from the palm of a wearer's hand.
Figure 7:
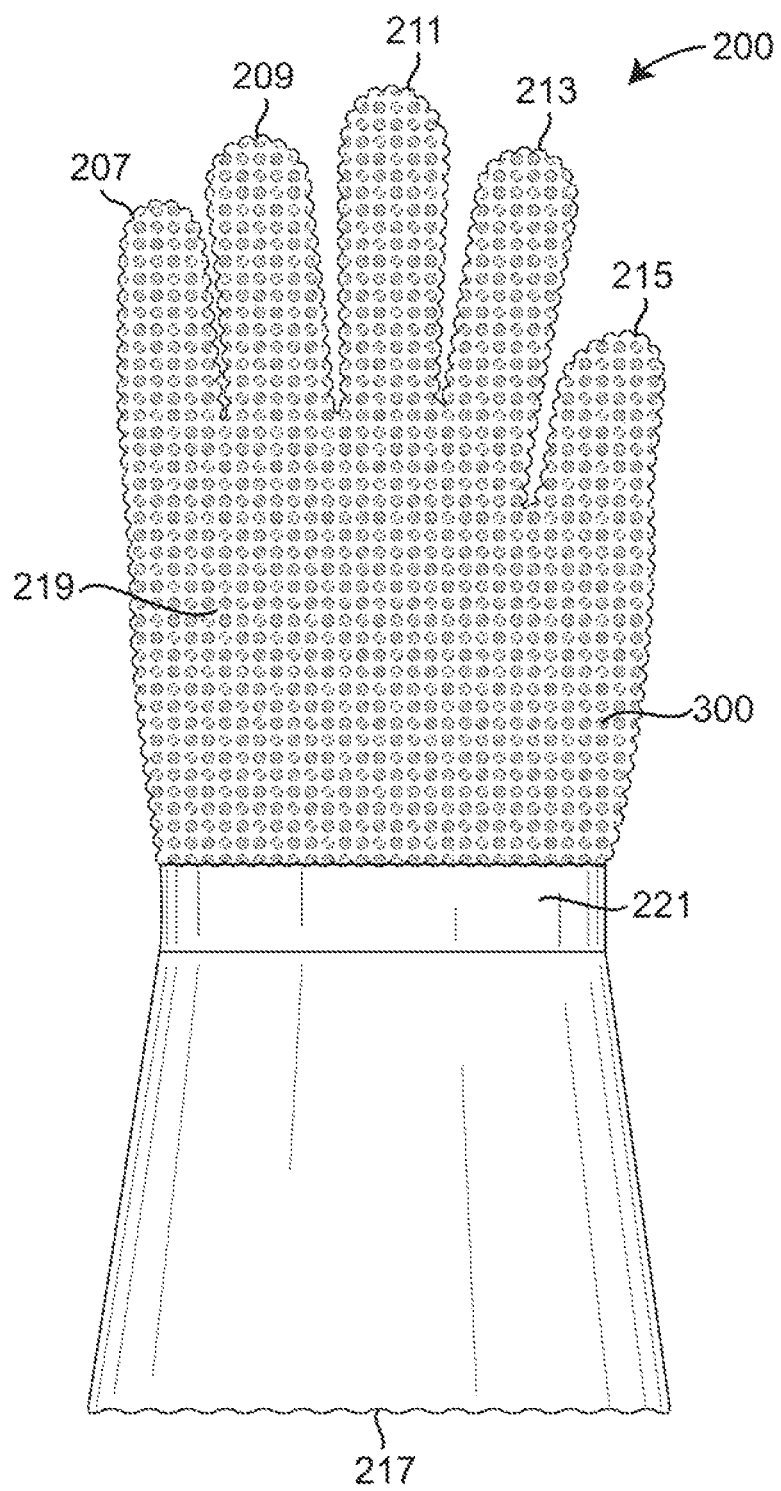
FIG. 7 is a plan view of the scrub glove depicted in FIG. 5 viewed from the back of the wearer's hand.
Figure 8:
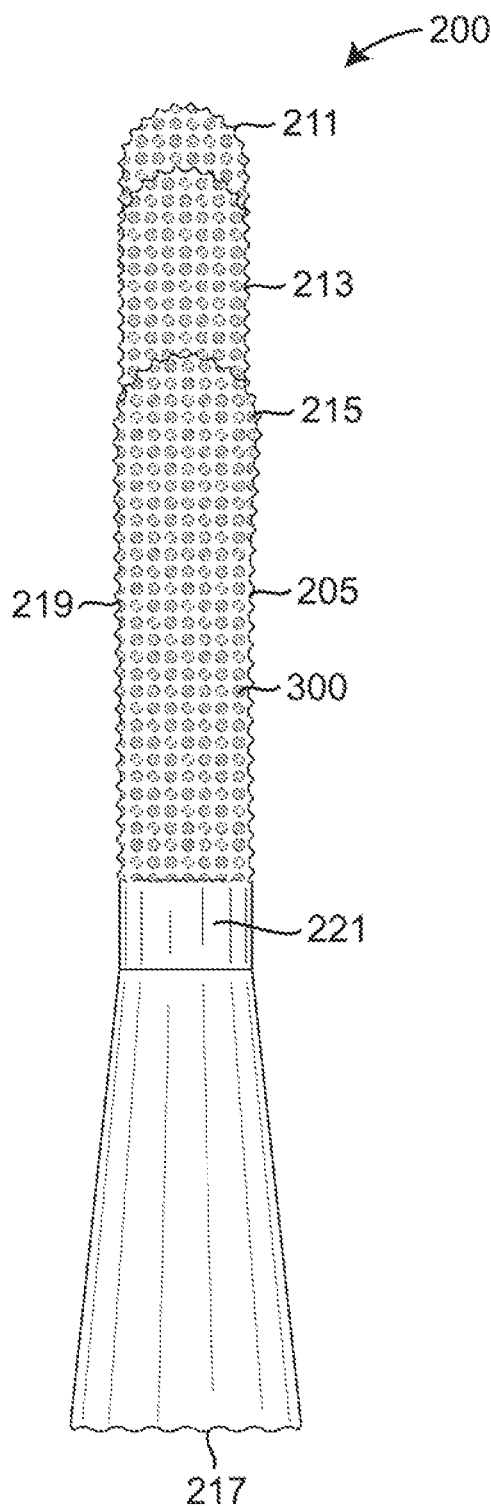
FIG. 8 is a side view of the scrub glove depicted in FIG. 5 viewed from the thumb side of the wearer's hand.
Figure 9:
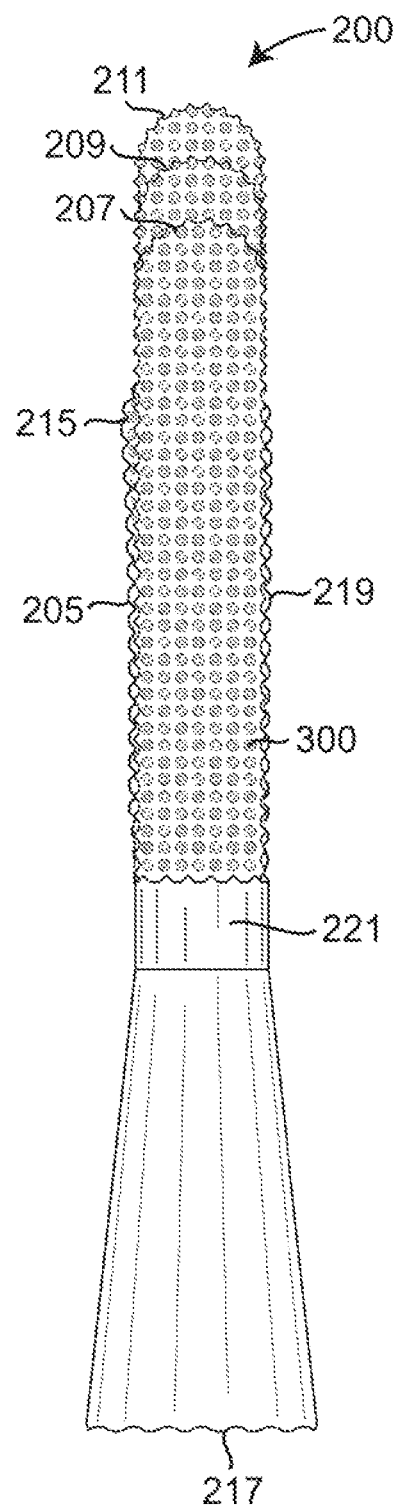
FIG. 9 is a side view of the scrub glove depicted in FIG. 5 viewed from the little finger side of the wearer's hand.
Figure 10:
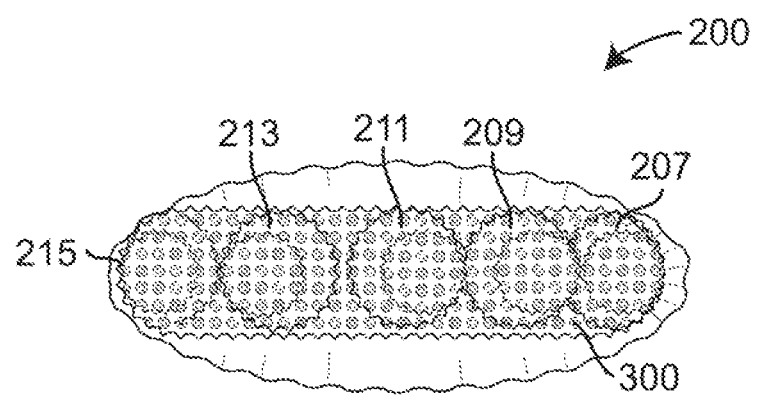
FIG. 10 is a front end view of the scrub glove depicted in FIG. 5.
Figure 11:
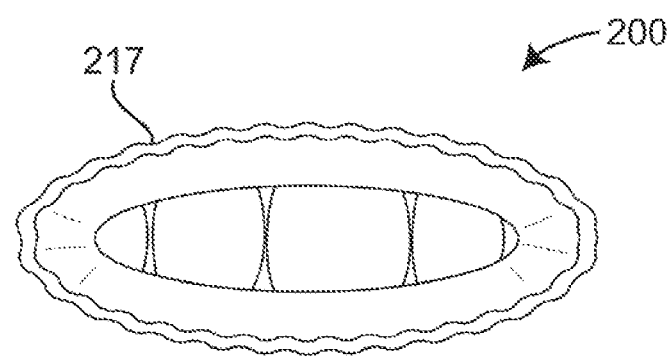
FIG. 11 is a rear end view of the scrub glove depicted in FIG. 5.

Those skilled iii the art will understand that layer 300 may be a unitary, one-piece layer of material formed to fit over the respective portions of each scrub glove 101 and 103; or, the layer 300 may be applied in sections. That is, a separate portion of layer 300 may be fitted over one or more of fingers 107, 109, 111, 113, and 115, another section of layer 300 over palm 105, and another section over backhand 119 of gloves 101 and 103. In another embodiment, as depicted in FIG. 4, a number of layers 301, 302, 303, and 304 each overlying the other, may be applied to the exterior of gloves 101 and 103. Typically, a scrub glove with a multi-layer covering may be used for more "heavy duty" cleansing operations. Further, layer 300 may be made of a single material or of multiple materials. Additionally, layer 300 may be made of different materials, wherein some layers of materials may not be overlying at least some of the other layers of materials. For example, in an embodiment, a layer 304 may cover only fingers 107, 109, 111, 113, and 115, but not palm 105. Other such multilayered constructions may be possible as would be appreciated by a person of ordinary skill in the art.

In an embodiment, each of gloves 101 and 103 will include a layer 300 that comprises four layers, 301, 302, 303, and 304, wherein layer 301 is the layer in the stack closest to the body of glove 101 or 103 and layer 304 is the layer in the stack furthest from the body of glove 101 or 103. In this embodiment, each of layers 301, 302, 303, and 304 may be made from the same material. For example, this material may be a nonporous polyester fiber having a dernier between about 400 and about 600. In other embodiments, the material of layer 300 may be any polyester fiber having a dernier between about 100 and about 900. Further, in yet other embodiments, the material of layer 300 may be any polyester fiber having a dernier of about 500. In other embodiments, the material may be a different material, such as nylon, or a semi-porous or porous polyester.

In this embodiment, layers 301 and 302 may be configured to supply a springy, resilient cushioning for a given glove 101 or 103. The springiness may be a function of the material and/or weave pattern used for layers 301 and 302. On the other hand, layers 303 and 304 may be configured to supply an abrasive texture to the exterior of a given glove 101 or 103. The abrasiveness of layers 303 and 304 will typically result in the exterior of a given glove 101 or 103 being abrasive. Further, the springiness of layers 301 and 302 may allow a wearer to control the level of abrasiveness applied to a surface being cleansed by glove 101 or 103. For example, a light pressure exerted by a wearer of a glove 101 or 103 may allow the abrasive layers 303 and 304 to press into the springy layers 301 and 302 when any roughness is encountered on the surface being cleansed by glove 101 or 103. This may result in less abrasiveness being experienced by the surface being cleansed by glove 101 or 103. However, as the exerted pressure is increased, layers 301 and 302 may compress, and, in turn, their springiness may change into a more solid surface. In such a case, there may be little room left for the abrasive layers 303 and 304 to press into layers 301 and 302. The result may be that with increased pressure, the gloves 101 and 103 may become more abrasive. Accordingly, a wearer of glove 101 or 103 may be able to modulate the relative abrasiveness of the relevant glove, which may allow the wearer to control the abrasiveness of the glove during cleansing. This may be beneficial in cleansing a large animal, for example, where less abrasiveness may be required around the animal's legs but more abrasiveness required on the animal's body.

In one embodiment, mesh layer 300 may be non-detachable from the base layer (or combination of base layers) of gloves 101 and 103, but rather may be bonded to the other portions of the scrub gloves 101 and 103 by a compound used to attach mesh layer 300 to the base layer (or combination of base layers). In another embodiment, layer 300 includes a base layer that fits over the exterior of glove 101 or glove 103, which base layer may be peeled from the relevant glove when worn with the base of a replacement layer then being fitted over the exterior of the relevant glove. Typically, this replacement of a base layer may be performed when the relevant glove is either being worn by the cleanser or fitted onto a fixture used for this purpose. In any case, the layer 300 and its abrasive, woven mesh material are typically capable of contacting or nearly contacting many of the hairs of a large animal being cleansed, unlike a curry brush. The abrasive nature of layer 300 is at least partially responsible because the abrasive portions may be capable of contacting smaller features including individual or small groups of hairs. The layer 300 and its abrasive, woven mesh material may sufficiently contact many or most of the hairs of the large animal being cleansed, which contact may result in the unwanted oils, salts, and grime built up on the hairs being removed. This, in turn, will typically cause the large animal's coat to shine and skin to breathe better once dry. Further, layer 300 may exfoliate the large animal's skin, maintaining a healthier epidermal environment.

In use, scrub gloves 101 and 103 may be employed by the wearer as an ergonomic and flexible scrubbing device. In some embodiments, a potential but non-limiting advantage of using gloves 101 and 103 may be that gloves 101 and 103 may easily conform to the shape or contour of an object being cleansed (for example, a large animal) just as the wearer's hand would touch or grasp the object. This easy and conforming use may result in a better cleansing of objects and surfaces than the wearer trying to scrub the objects or surfaces using a cloth or brush. Instead, the wearer using scrub gloves 101 and 103 may generally employ a wiping motion over the objects or surfaces being cleansed. If there are intricate contours (such as, for example, on a horse's head), depressions, or recesses, the wearer may use the tip ends of fingers 107, 109, 111, 113, and 115 of scrub gloves 101 and 103 to fit into and scrub these areas to cleanse them. After use, scrub gloves 101 and 103 may themselves be cleansed by rinsing with a gentle cleansing solution either by hand or by placing gloves 101 and/or 103 in a washing machine, such as a dishwasher. In this regard, common, well-known, over-the-counter household kitchen and bathroom cleansing solutions or products may be used as cleansing agents on gloves 101 and 103. The scrub gloves 101 and 103 may also be air-dried. In addition, when used to perform certain types of cleansing (as, for example, when a mold is encountered), the scrub gloves 101 and 103 may be placed into a disinfectant solution, as well as into a cleansing solution, to clean them after use. Those skilled in the art will understand that, over time, use or damage to scrub gloves 101 and/or 103 may necessitate their replacement.

Typically, scrub gloves 101 and 103 nay be sold in pairs comprising a right-hand glove 101 and a left-hand glove 103. Either or both gloves 101 and 103 may be worn during cleansing. Further, in some embodiments, gloves 101 and 103 will be identical, and in other embodiments, gloves 101 and 103 will be different in shape, size, appearance, or other characteristic. While not shown in the drawings, it will be appreciated that gloves 101 and 103 may be constructed in a variety of colors. In addition, scrub gloves 101 and 103 may be constructed in both a light duty (i.e., dusting) cleansing embodiment and a heavy-duty cleansing embodiment. In an exemplary light-duty cleansing embodiment of scrub gloves 101 and 103, layer 300 may be made of a cotton/nylon weave that is replaceable. In such an embodiment, typically a second layer having finer abrasive qualities may be fitted over layer 300.

Figure 12:
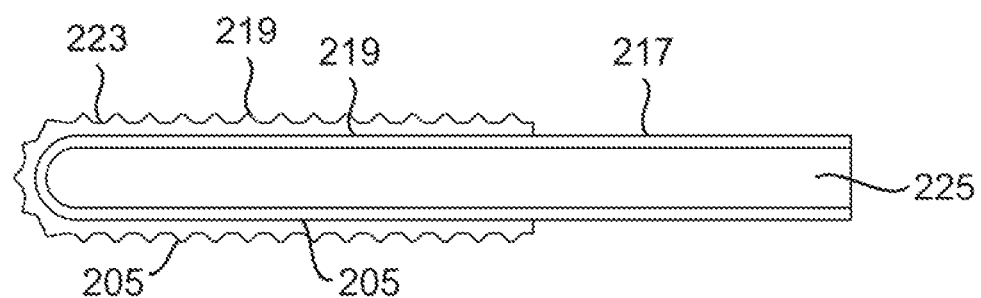
FIGS. 12, 13, and 14 respectively illustrate manufacture of the scrub glove depicted in FIG. 5.
Figure 13:
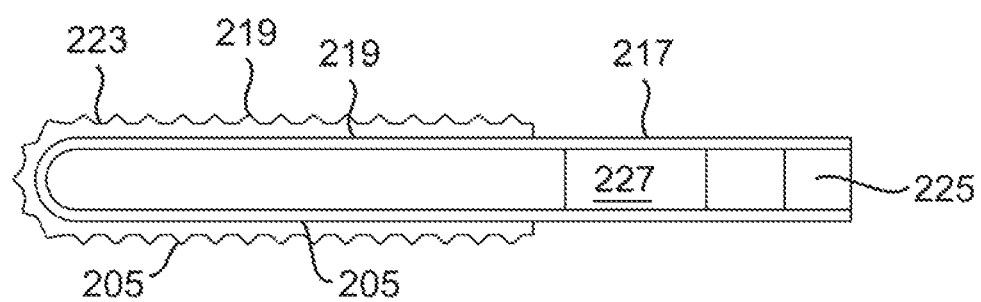
Figure 14:
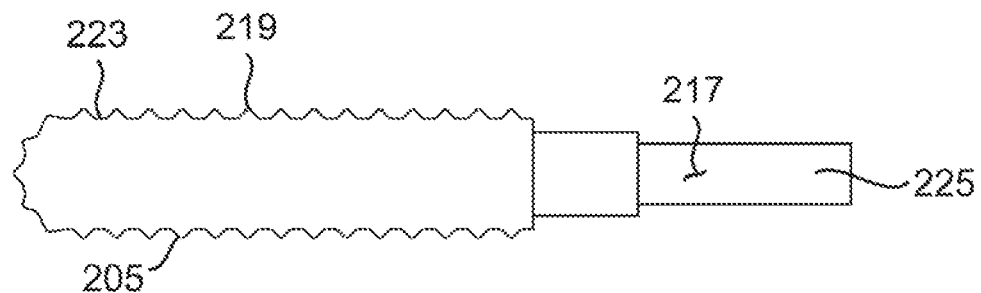

Referring to FIGS. 5-11, a second embodiment of a scrub glove is indicated generally as 200. Scrub glove 200 may also be an ergonomic scrub glove used for scrubbing various surfaces (such as large animals) to thoroughly cleanse them. As depicted in FIGS. 12, 13, and 14, scrub glove 200 may comprise a first, inner layer 225 made of rubber or other material impervious to liquids. Inner layer 225 may be formed to include a thumb and four fingers 207, 209, 211, 213, and 215, a palm portion 205, a backhand portion 219, and an open, cuff end 217 that extends up past a wearer's wrist and a lower portion of the wearer's forearm so to protect these body parts from exposure to cleansing solutions with which scrub glove 200 may be used.

Next, glove 200 may include a second, outer layer 223. Outer layer 223 may be shaped to fit over inner layer 225 including thumb and four fingers 207, 209, 211, 213, and 215, palm 205, and backhand 219 of the wearer's hand, but it may not, in an embodiment, cover the wearer's wrist and forearm. Further, the outer surface of outer layer 223 may comprise an abrasive, woven mesh material, such as the material discussed above used in layer 300. Both inner layer 225 and outer layer 223 may be each made of one piece. In some embodiments, inner layer 225 and outer layer 223 may be made from the same material. In yet other embodiments, inner layer 225, outer layer 223, or both, may be made from a compound of multiple materials, and may be the same or different from each other.

In an embodiment, to form glove 200, and as shown in FIG. 13, the open, cuff end 217 of inner layer 225 may be fitted onto a fixture 227 to which a source of air (not shown) may be connected. Next, inner layer 225 may be fitted onto fixture 227. Then the air may be used to slightly inflate inner layer 225. While inner layer 225 is inflated, outer layer 223 may be fitted over inner layer 225. In doing so, the inner face of outer layer 223 may fit snuggly against the outer face of inner layer 225. However, in an embodiment, outer layer 223 does not adhere to inner layer 225. Accordingly, when the an pressure is removed from inner layer 225, inner layer 225 and outer layer 223 would not adhere to each other. Rather, when glove 200 is used for scrubbing, outer layer of glove 200 may be able to move separately and freely from inner layer 225. In other embodiments, outer layer 223 may be adhered to inner layer 225. As can be seen in FIGS. 5-11, the outer layer 223 may comprise only a portion of the glove 200 allowing a portion of the cuff end 217 to remain uncovered. In this arrangement, a band 221 may be fitted over the open end of outer layer 223 at a region where the outer layer 223 fits over and completely around cuff end 217 of inner layer 225. This is the area where the open end of outer layer 223 overlays the cuff portion of inner layer 225, as shown in FIG. 14. After band 221 is fitted in place, it may be secured to both layers of glove 200 by radio frequency heating or other bonding process. The result may be that outer layer 223 and inner layer 225 of glove 200 are secured together such that they will not separate from each other despite the amount and type of cleansing use to which glove 200 is subjected. In an embodiment, the band 221 may comprise the only point of attachment between the inner layer 225 and the outer layer 223, allowing the outer layer 223 to move relative to the inner layer 225 when the glove is in use. This may provide for a slightly different cleansing action than if the inner layer 225 and outer layer 223 are connected together at more points so that they cannot move relative to each other.

This floating or non-adhered layering design may provide additional benefits when dirt and grime are forced into the weave. Specifically, the grime may be back flushed out of the woven material through the glove cleaning process. When cleaned, water and/or cleaning solution may flow through outer layer 223 and may contact waterproof rubber inner layer 225. The water and/or cleaning solution may become pressurized between the two layers, which may result in the material being redirected out away from glove 200 through outer layer 223. During this process, dirt and grime that was caught between the layers may be removed.

Figure 15:
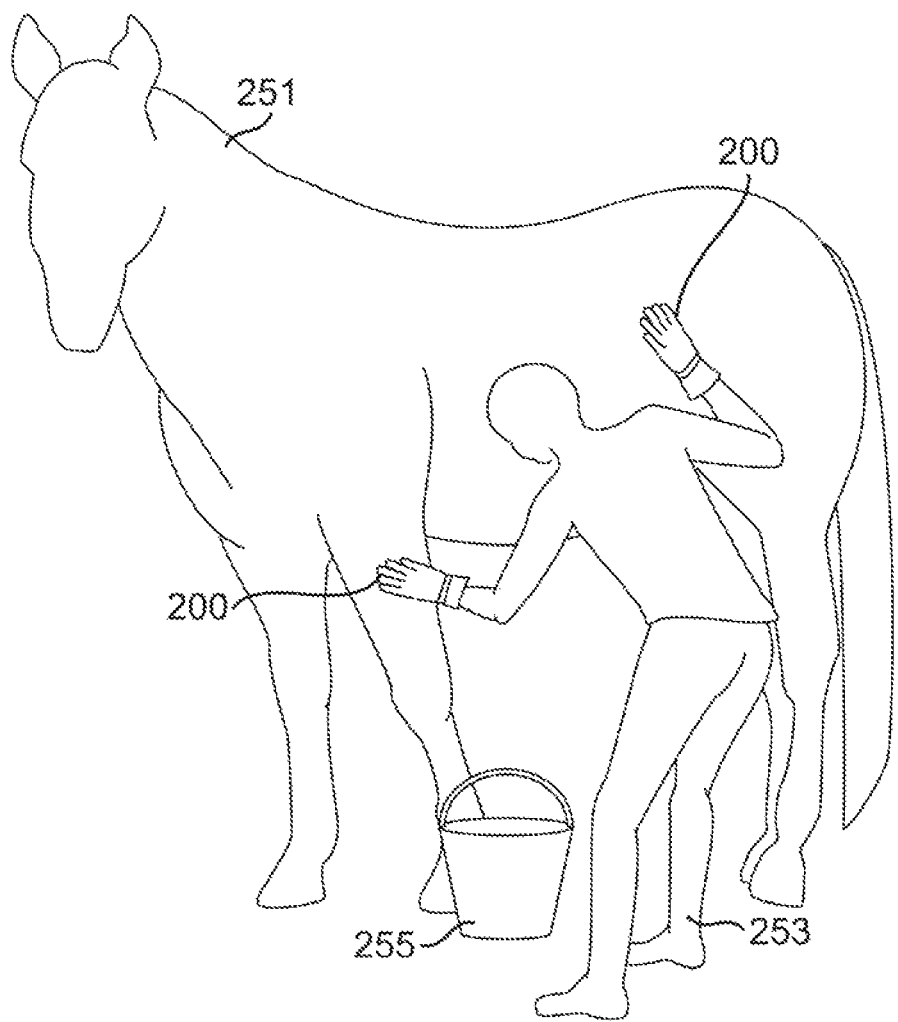
FIGS. 15 and 16 depict a process for cleansing a large animal using a scrub glove.
Figure 16:
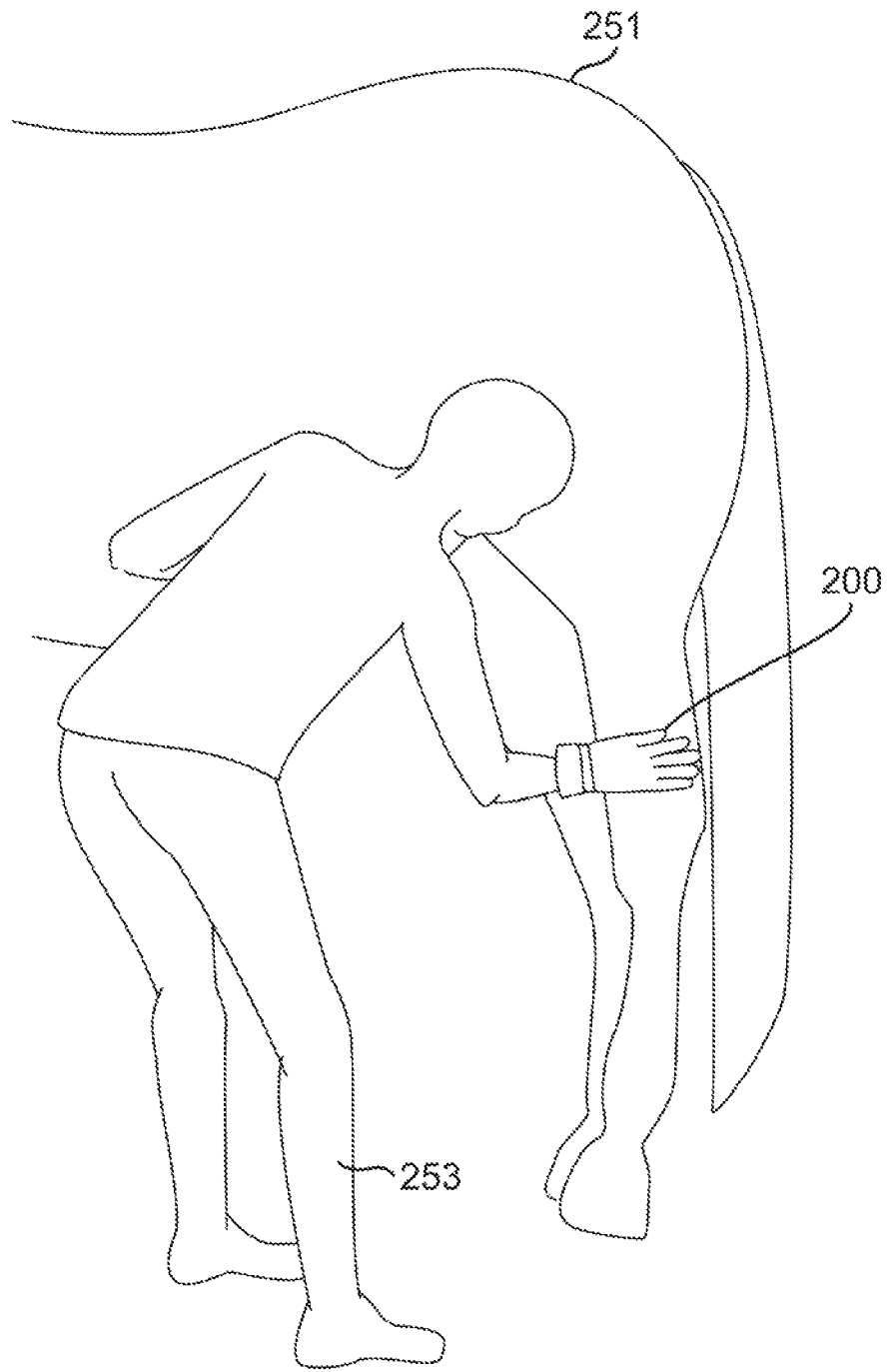

As depicted in FIGS. 15 and 16, a process for cleansing a large animal will now be described. As depicted in FIG. 15, a cleanser 253 may approach a large animal, such as a horse 251. Cleanser 253 may then wet horse 251 using a bucket, hose, or other water source. The water used will typically be clean water. Cleanser 253 may begin wetting horse 251 at horse 251's feet and then continue wetting horse 251 at successively higher regions of horse 251. This bottom to top approach to wetting horse 251 is typically performed to reduce the chance that horse 251 will become upset at the wetting process.

Next, cleanser 253 may fill a bucket 255 with a cleansing solution. Then, cleanser 253 may place one or more gloves 200 onto cleanser 253's hand or hands. Cleanser 253 may then place gloves 200 into bucket 255 that contains the cleansing solution. Cleanser 253 will typically move gloves 200 around in the cleansing solution to facilitate transfer of the cleansing solution onto gloves 200. Once a sufficient quantity of cleansing solution has been delivered onto gloves 200, cleanser 253 may begin to cleanse horse 251.

In an embodiment, cleanser 253 may separate horse 251's body into different portions, cleansing those different portions in order. For example, cleanser 253 may determine to cleanse horse 251's left-side legs, right-side legs, left-side body, right-side body, rear end body, top body, and head, in that order. In such an embodiment, cleanser 253 may first use gloves 200 (which have absorbed some cleansing solution) to cleanse horse 251's left-side legs. In doing so, cleanser 253 may gently grip each of the left-side hind and left-side front legs in turn, using gloves 200. Further, cleanser 253 may move their gloved hands in a scrubbing motion (for example, in a generally circular motion, a back-and-forth motion, an up-and-down motion, or other motion) to apply the cleansing surfaces of gloves 200 to horse 251's left-side hind and left-side front legs. This scrubbing motion, in combination with the abrasive nature and cleansing-solution-holding ability of gloves 200, will cleanse horse 251's left-side hind and left-side front legs. Subsequently, once horse 251's left-side hind and left-side front legs have been sufficiently scrubbed, cleanser 253 may rinse horse 251's left-side hind and left-side front legs. FIG. 15 shows a close-up depiction of cleanser 253 scrubbing horse 251's left-side hind leg.

This motion-based cleansing process, followed by a rinse, may be repeated for each portion of horse 251 that was determined by cleanser 253. Once each portion of horse 251 has been cleansed by cleanser 253, cleanser 253 may rinse horse 251 a final time. Next, horse 251 will typically be dried using, for example, towels or other water-absorbent materials.

One potential benefit of the construction of glove 200 (or 101 or 103) is that it may allow cleanser 253 to cleanse a large animal using their hands in a relatively intuitive and natural manner. Stated another way, humans are very good at using their hands, and glove 200 may allow cleanser 253 to exert more control over the cleansing process by providing a cleansing device that they may easily, intuitively, and naturally control with their hands. For example, consider that glove 200 may allow cleanser 253 to cleanse a large animal using careful and differential pressure applied by cleanser 253's fingers, palm, and backhand. Cleanser 253, in their discretion, may apply different amounts of pressure to at least one of those portions of their hands. Further, cleanser 253 is easily in control of how much pressure is used because cleanser 253 is using their hand almost directly to apply the pressure. This may assist cleanser 253 in cleansing portions of large animals that are sensitive, bony, full with veins, and/or otherwise incompatible with excess pressure being applied. Overall, the ability of cleanser 253 to use their hands may provide a more natural and secure feel to the animal, as well as allow cleanser 253 to apply liniment to massage muscles, bug sprays, and medicine to the body of the animal more efficiently and effectively than traditional methods. In some cases, glove 200 may be used to gently cleanse a freshly wounded area on a large animal without unintentionally removing scabs. This is in stark contrast to a curry brush/glove, which curry brush/glove would typically scratch or rake wounded areas, removing scabs and reopening wounds and increasing the chances for scarring and/or infection.

In another embodiment, the cleansing solution may be supplemented or substituted with a solid cleansing product. For example, without limitation, the cleansing solution may be substituted with a bar of soap or other solid cleansing product. In such an embodiment, cleanser 253 may be able to hold the bar of soap using one or more gloves 200 (or 101 or 103). In holding the bar of soap with glove 200, cleanser 253 may rub the bar of soap onto the large animal (e.g., horse 251) after wetting the large animal. At that time, glove 200 may be simultaneously scrubbing the large animal with portions of glove 200 that are not obstructed by the bar of soap. Further, glove 200 may be used to scrub subsequent to the application of the bar of soap. In any case, glove 200 may prevent contact between the bar of soap and cleanser 253's hands. The flexibility and ergonomics of gloves 200 may make the process of grasping a bar of soap easier than would be true for prior cleansing devices. Specifically, the ability of glove 200 to allow cleanser 253 to use their hands in an intuitive and natural manner may facilitate relatively difficult manual tasks, such as holding a wet and slippery bar of soap.

In yet another embodiment, the cleansing solution may be added directly to glove 200 or to the large animal. In such an embodiment, glove 200 may be used to spread the cleansing solution around the large animal's coat and skin, in addition to providing scrubbing. The direct application of cleansing solution to glove 200 or the large animal may be supplemental to or a substitution for the cleansing solution placed into bucket 255. In such an embodiment, glove 200 may be used to apply cleansing solution to the large animal, move the cleansing solution around the large animal's coat and skin, and scrub the large animal's coat and skin. In an embodiment, a bar of soap or similar solid cleansing product or a package of a liquid cleanser may be placed between the inner layer 225 and the outer layer 223. This may be via the user such as, via the band 221 being partially opened by the user, or may be during initial assembly of the glove 200.

For any embodiment of gloves 101, 103, or 200, an interior hand layer may be included within the relevant glove 101, 103, or 200. Such an interior hand layer may conform to the interior of the relevant glove itself, and may or may not be bonded to the interior of the relevant, glove. In an embodiment, the interior hand layer may use a bonding or friction to prevent or reduce relative movement between the interior hand layer and the interior of the relevant glove. Further, the interior hand layer may be made of any material. In some embodiments, the interior hand layer may be made of an insulating material, such as cotton. Such an interior hand layer may have any of several benefits. Such benefits may include easing the process of putting on and taking off the relative glove. Another potential benefit may be that the interior hand layer may absorb hand sweat from the wearer. Other potential benefits may include providing insulation without losing touch-based feedback from the relevant glove. For example, large animals often need to be cleansed outside, even when the weather is cold. In such a case, the water being used to cleanse the large animal may be cold. This insulating interior hand layer may provide sufficient hand insulation for the wearer to prevent discomfort during cold weather cleansing. Other benefits may be found by using an interior hand layer, as would be appreciated by persons of ordinary skill in the art.

In an embodiment, scrub gloves 101, 103, and/or 200 may be used to provide an enhanced touch sensation to a large animal, including without limitation an elephant. For example, in an embodiment, scrub gloves 101, 103, and/or 200 may be used by an animal keeper, such as a zookeeper, to provide an enhanced touch when touching an elephant. For a variety of reasons, some zookeepers regularly use their hands to touch the elephants under their supervision. Generally, it is important for the elephants to perceive these touches from the zookeeper. However, elephants have relatively thick, rough, and tough skin, which skin may make it difficult for the zookeeper's touch to be felt by the elephants. Accordingly, there may be a benefit for zookeepers to using a touch-enhancing device in order to increase the zookeeper's ability to supply a touch that may be felt by the elephant. In such a case, scrub gloves 101, 103, and/or 200 may be used by the zookeeper to provide an enhanced touch when touching the elephant. The touch using scrub gloves 101, 103, and/or 200 may be enhanced over a bare hand due, at least in part, to the abrasiveness of layer 300. Such abrasiveness may reduce the amount of pressure required to be exerted by the zookeeper to ensure that elephant perceives the zookeeper's touch. Further, in such a case, layer 300 may use materials with a larger denier number, such as polyester fibers having a denier between about 800 and about 1200. In some embodiments, layer 300 may have a denier of about 900. This process may also be used to promote general bonding between a large animal and a keeper of the large animal.

In another embodiment, scrub gloves 101, 103, and/or 200 may be used to apply and rub in an ointment or medical substance for a large animal. For example, in an embodiment, scrub gloves 101, 103, and/or 200 may be used by an animal keeper, such as a zookeeper, to provide a means for applying a fungicidal shampoo or wash to a large animal. The use of scrub gloves 101, 103, and/or 200 for such an application may have one or more of many advantages. First, the scrub gloves 101, 103, and/or 200 may prevent the zookeeper's skin from coming into contact with the fungicidal shampoo or wash (or other medical substance). This may be advantageous where contact with the fungicidal shampoo or wash may be undesirable. Second, the use of scrub glove 101, 103, and/or 200 for such an application may increase the effectiveness of the treatment itself. For example, scrub glove 101, 103, and/or 200 may more effectively treat the surfaces of the large animal's coat and skin during application, at least by using the abrasive nature of layer 300 to apply the fungicidal shampoo or wash directly to hairs or groupings of hairs and skin. Third, this process may make it easier to apply the fungicidal shampoo or wash to hard-to-reach or sensitive areas of the large animal.

In yet another embodiment, scrub gloves 101, 103, and/or 200 may be used to apply and rub in green spot remover and/or dry shampoos to a large animal. For example, in an embodiment, scrub gloves 101, 103, and/or 200 may be used by an animal keeper, such as a zookeeper, to provide a means for applying a green spot remover and/or dry shampoos to a large animal. The use of scrub gloves 101, 103, and/or 200 for such an application may have one or more of many advantages. First, the scrub gloves 101, 103, and/or 200 may prevent the zookeeper's skin from coming into contact with the green spot remover and/or dry shampoos. This may be advantageous where contact with the green spot remover and/or dry shampoos may be undesirable. Second, the use of scrub glove 101, 103, and/or 200 for such an application may increase the effectiveness of the cleansing itself. For example, scrub glove 101, 103, and/or 200 may more effectively treat the surfaces of the large animal's coat and skin during application, at least by using the abrasive nature of layer 300 to apply the green spot remover and/or dry shampoos directly to hairs or groupings of hairs and skin. Third, this process may make it easier to apply the green spot remover and/or dry shampoos to hard-to-reach or sensitive areas of the large animal.

In yet another embodiment, scrub gloves 101, 103, and/or 200 may be used to apply and rub in fly spray or other insect repellant/killer to a large animal. For example, in an embodiment, scrub gloves 101, 103, and/or 200 may be used by an animal keeper, such as a zookeeper, to provide a means for applying fly spray or other insect repellant/killer to a large animal. The use of scrub gloves 101, 103, and/or 200 for such an application may have one, or more of many advantages. First, the scrub gloves 101, 103, and/or 200 may prevent the zookeeper's skin from coming into contact with the fly spray or other insect repellant/killer. This may be advantageous where contact with the fly spray or other insect repellant/killer may be undesirable. Second, the fly spray or other insect repellant/killer may be applied directly to scrub glove 101, 103, and/or 200, which application may generally reduce the distribution of the fly spray into the air, which may in turn reduce the inhalation of the fly spray by the zookeeper. Third, the use of scrub glove 101, 103, and/or 200 for such an application may increase the effectiveness of the treatment itself. For example, scrub glove 101, 103, and/or 200 may more effectively treat the surfaces of the large animal's coat and skin during application, at least by using the abrasive nature of layer 300 to apply the fly spray or other insect repellant/killer directly to hairs or groupings of hairs and skin. Fourth, this process may make it easier to apply the fly sprays or other insect repellant/killer to hard-to-reach or sensitive areas of the large animal.

Finally, it is notable that scrub gloves 101, 103, and/or 200 may be used to cleanse more than just large animals. For example, scrub gloves 101, 103, and/or 200 may be used to cleanse, without limitation, tools, trailers, troths, stalls, tack, gear, gates, vehicles, and nearly any other device or surface. Further, layer 300 may include a self-knotting weave, as would be understood by persons of ordinary skill in the art. In such an embodiment, if a portion of the weave gets snagged on something and pulled, the knot itself may be cut off and use of glove 101, 103, and/or 200 may continue.

While the invention has been disclosed in conjunction with a description of certain embodiments, the detailed description is intended to be illustrative and should not be understood to limit the scope of the present disclosure. As would be understood by one of ordinary skill in the art, embodiments other than those described in detail herein are encompassed by the disclosed invention. Modifications and variations of the described embodiments may be made without departing from the spirit and scope of the invention.

It will further be understood that any of the ranges, values, properties, or characteristics given for any single component of the present disclosure can be used interchangeably with any ranges, values, properties, or characteristics given for any of the other components of the disclosure, where compatible, to form an embodiment having defined values for each of the components, as given herein throughout. Further, ranges provided for a genus or a category can also be applied to species within the genus or members of the category unless otherwise noted.

Finally, the qualifier "generally," and similar qualifiers as used in the present case, would be understood by one of ordinary skill in the art to accommodate recognizable attempts to conform a device to the qualified term, which may nevertheless fall short of doing so. This is because terms such as "circular" are purely geometric constructs and no real-world component is a true "circular" in the geometric sense. Variations from geometric and mathematical descriptions are unavoidable due to, among other things, manufacturing tolerances resulting in shape variations, defects and imperfections, non-uniform thermal expansion, and natural wear. Moreover, there exists for every object a level of magnification at which geometric and mathematical descriptors fail due to the nature of matter. One of ordinary skill would, thus understand, the term "generally" and relationships contemplated herein regardless of the inclusion of such qualifiers to include a range of variations from the literal geometric meaning of the term in view of these and other considerations.

The invention claimed is:

1. A method of cleansing a non-human animal, the method comprising:
    wetting a non-human animal;
    providing a cleansing glove, said cleansing glove comprising:
        an inner waterproof layer forming a palm portion, a backhand portion, a cuff portion, a thumb portion and at least one finger portion; and
        an outer woven mesh layer overlying said palm portion, said backhand portion, said thumb portion and said at least one linger portion;
    placing, said cleansing glove on a hand of a human user;
    immersing said cleansing glove in a liquid cleansing material;
    moving said cleansing glove within said liquid cleaning material to capture some of said liquid cleansing material in said outer woven mesh layer and at least some of said liquid cleansing material between said outer woven mesh later and said inner waterproof layer;
    transferring said cleansing solution captured by said cleansing glove to said non-human animal; and
    rinsing said cleansing solution from said non-human animal.

2. The method of claim 1, wherein said outer woven mesh layer is attached to said inner waterproof layer only at a hand located at said cuff.

3. The method of claim 1, wherein said outer woven mesh layer is a multi-layer structure.

4. The method of claim 3, wherein said multi-layer structure comprises 4 layers.

5. The method of claim 3, wherein at least one layer in said multi-layer structure is formed of woven non-porous polyester fiber.

6. The method of claim 5, wherein said non-porous polyester fiber is between 100-1200 denier.

7. The method of claim 6, wherein said non-porous polyester fiber is between 100-900 denier.

8. The method of claim 6, wherein said non-porous polyester fiber is between 400-600 denier.

9. The method of claim 6, wherein said non-porous polyester fiber is between 800-1200 denier.

10. A scrub glove, the scrub glove comprising:
    an inner waterproof layer formed to fit over a wearer's thumb, fingers, palm, and back of their hand, said inner layer further including a cuff;
    an outer layer of an abrasive woven mesh material formed to fit over said inner layer; and
    a band fitting over and about an open end of said outer layer where said open end is positioned about said cuff of said inner layer, said band securing said open end and said cuff;
    wherein said inner and outer layers are only secured by said band so when said glove is used for cleaning, said outer layer of said glove moves separately from said inner layer; and
    wherein at least a portion of said inner layer is not within said outer layer.

11. The scrub glove of claim 10 wherein said band is secured in place by radio frequency (rF) heating.

12. The scrub glove of claim 10 wherein said inner waterproof layer of said scrub glove is made of a rubber material.

13. The method of claim 10, wherein said outer layer is a multi-layer structure.

14. The method of claim 13, wherein said multi-layer structure comprises 4 layers.

15. The method or claim 13, wherein at least one layer in said multi-layer structure is formed of woven non-porous polyester fiber.

16. The method of claim 15, wherein said non-porous polyester fiber is between 100-1200 denier.

17. A method of cleansing a non-human animal, the method comprising:

wetting a non-human animal;

providing a cleansing glove, said cleansing glove comprising:

an inner waterproof layer formed to fit over a wearer's thumb, fingers, palm, and back of their hand, said inner layer further including a cuff, an outer player of an abrasive woven mesh material formed to fit over said inner layer; and a band fitting over and about an open end of said outer layer where said open end is positioned about said cuff of said inner layer, said band securing said open end and said cuff;

wherein said inner and outer layers are only secured by said band so when said glove is used for cleaning, said outer layer of said glove moves separately from said inner layer; and wherein at least a portion of said inner layer is not within said outer layer;

placing said cleansing glove on a hand of a human user;

capturing cleansing material in at least one of said outer woven mesh layer and between said outer woven mesh later and said inner waterproof layer;

transferring said cleansing solution captured by said cleansing, glove to said non-human animal; and rinsing said cleansing solution from said non-human animal.

18. The method of claim 17 wherein said capturing comprises:

immersing said cleansing glove in a liquid cleansing material; and moving said cleansing glove within said liquid cleaning material.

19. The method of claim 17 wherein said capturing comprises:

placing a solid cleansing product between said inner waterproof layer and said outer layer.

* * * * *